(12) United States Patent
Nolan et al.

(10) Patent No.: US 8,316,227 B2
(45) Date of Patent: Nov. 20, 2012

(54) HEALTH INTEGRATION PLATFORM PROTOCOL

(75) Inventors: Sean Patrick Nolan, Bellevue, WA (US); Johnson T. Apacible, Mercer Island, WA (US); Jeffrey Dick Jones, Woodinville, WA (US); Cezary Marcjan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 11/745,904

(22) Filed: May 8, 2007

(65) Prior Publication Data

US 2008/0101597 A1     May 1, 2008

Related U.S. Application Data

(60) Provisional application No. 60/863,897, filed on Nov. 1, 2006.

(51) Int. Cl.
*H04L 29/06* (2006.01)
(52) U.S. Cl. ........ 713/151; 713/150; 713/176; 370/230; 370/395.7; 370/469; 705/1.1
(58) Field of Classification Search .................. None
See application file for complete search history.

(56) References Cited

U.S. PATENT DOCUMENTS

| | | | |
|---|---|---|---|
| 5,213,555 A | 5/1993 | Hood et al. | |
| 5,265,010 A | 11/1993 | Evans-Paganelli et al. | |
| 5,690,582 A | 11/1997 | Ulrich et al. | |
| 5,857,967 A | 1/1999 | Frid et al. | |
| 5,890,995 A | 4/1999 | Bobick et al. | |
| 5,924,074 A | 7/1999 | Evans | |
| 6,002,982 A | 12/1999 | Fry | |
| 6,013,007 A | 1/2000 | Root et al. | |
| 6,057,758 A | 5/2000 | Dempsey et al. | |
| 6,151,624 A | 11/2000 | Teare et al. | |
| 6,253,208 B1 | 6/2001 | Wittgreffe et al. | |
| 6,259,944 B1 | 7/2001 | Margulis et al. | |
| 6,374,237 B1 | 4/2002 | Reese | |
| 6,542,902 B2 | 4/2003 | Dulong et al. | |
| 6,578,068 B1 | 6/2003 | Bowman-Amuah | |
| 6,622,231 B2 | 9/2003 | Kaufman et al. | |

(Continued)

FOREIGN PATENT DOCUMENTS

JP    2004-164052 A    6/2004

(Continued)

OTHER PUBLICATIONS

Raimir, "A Lossless Compression Method for Internet Packet Headers", 2005, Next Generation Internet Networks-IEEE, pp. 233-239.*

(Continued)

*Primary Examiner* — Taghi Arani
*Assistant Examiner* — Gregory Lane
(74) *Attorney, Agent, or Firm* — Hope Baldauff Hartman, LLC

(57) ABSTRACT

A protocol is provided for communicating data between two applications. The protocol can support communication of an extensible markup language (XML) document over hypertext transfer protocol (HTTP) by associating the XML document with a data envelope and sending the data envelope to a disparate application. The data envelope can comprise a header, which can specify supported compression methods, encryption keys, and/or data specific to the disparate application and/or the sending application. The protocol adds a layer of security to the communication and can prevent malicious requests and other attacks. This protocol can also be used in conjunction with a health integration network.

15 Claims, 10 Drawing Sheets

U.S. PATENT DOCUMENTS

| | | |
|---|---|---|
| 6,692,435 B1 | 2/2004 | Choate |
| 6,704,798 B1 | 3/2004 | Mogul |
| 6,763,382 B1 | 7/2004 | Balakrishnan et al. |
| 6,912,534 B2 | 6/2005 | DeBettencourt et al. |
| 6,996,558 B2 | 2/2006 | Dettinger et al. |
| 7,082,427 B1 | 7/2006 | Seibel et al. |
| 7,111,172 B1 | 9/2006 | Duane et al. |
| 7,203,623 B2 | 4/2007 | Garcea et al. |
| 7,217,224 B2 | 5/2007 | Thomas |
| 7,230,529 B2 | 6/2007 | Ketcherside, Jr. et al. |
| 7,292,867 B2 | 11/2007 | Werner et al. |
| 7,317,927 B2 | 1/2008 | Staton et al. |
| 7,363,298 B2 | 4/2008 | Kadatch et al. |
| 7,398,263 B2 | 7/2008 | Dettinger et al. |
| 7,480,512 B2 | 1/2009 | Graham et al. |
| 7,603,255 B2 | 10/2009 | Case, Jr. et al. |
| 7,613,722 B2 | 11/2009 | Horvitz et al. |
| 7,695,406 B2 | 4/2010 | Waters |
| 7,702,906 B1 | 4/2010 | Karr et al. |
| 7,730,528 B2 | 6/2010 | Chun et al. |
| 7,822,620 B2 * | 10/2010 | Dixon et al. ............ 705/1.1 |
| 7,904,487 B2 * | 3/2011 | Ghatare ............ 707/803 |
| 2001/0000358 A1 | 4/2001 | Isomichi et al. |
| 2001/0001147 A1 | 5/2001 | Hutchison et al. |
| 2001/0009454 A1 | 7/2001 | Manico et al. |
| 2002/0010679 A1 | 1/2002 | Felsher |
| 2002/0103811 A1 | 8/2002 | Fankhauser et al. |
| 2002/0120472 A1 | 8/2002 | Dvorak et al. |
| 2002/0126849 A1 | 9/2002 | Howard, Jr. et al. |
| 2002/0129031 A1 | 9/2002 | Lau et al. |
| 2002/0138324 A1 | 9/2002 | Zarefoss et al. |
| 2002/0198739 A1 | 12/2002 | Lau et al. |
| 2003/0035371 A1* | 2/2003 | Reed et al. ............ 370/230 |
| 2003/0037054 A1* | 2/2003 | Dutta et al. ............ 707/100 |
| 2003/0037069 A1 | 2/2003 | Davison |
| 2003/0051146 A1 | 3/2003 | Ebina et al. |
| 2003/0078934 A1 | 4/2003 | Cappellucci et al. |
| 2003/0081791 A1* | 5/2003 | Erickson et al. ............ 380/282 |
| 2003/0088438 A1 | 5/2003 | Maughan et al. |
| 2003/0149526 A1 | 8/2003 | Zhou et al. |
| 2003/0154406 A1 | 8/2003 | Honarvar et al. |
| 2003/0167274 A1 | 9/2003 | Dettinger et al. |
| 2003/0167456 A1 | 9/2003 | Sabharwal |
| 2003/0182361 A1 | 9/2003 | Jensen et al. |
| 2003/0212673 A1 | 11/2003 | Kadayam et al. |
| 2004/0017917 A1 | 1/2004 | Hammersmith et al. |
| 2004/0064502 A1 | 4/2004 | Yellepeddy et al. |
| 2004/0068653 A1 | 4/2004 | Fascenda |
| 2004/0088374 A1 | 5/2004 | Webb et al. |
| 2004/0088548 A1 | 5/2004 | Smetters et al. |
| 2004/0148276 A1 | 7/2004 | Dettinger et al. |
| 2004/0228492 A1 | 11/2004 | Park |
| 2005/0075996 A1 | 4/2005 | Dettinger et al. |
| 2005/0081039 A1* | 4/2005 | Lee et al. ............ 713/176 |
| 2005/0108537 A1 | 5/2005 | Puri et al. |
| 2005/0114501 A1 | 5/2005 | Raden et al. |
| 2005/0138417 A1* | 6/2005 | McNerney et al. ............ 713/201 |
| 2005/0144182 A1 | 6/2005 | Boris et al. |
| 2005/0165798 A1 | 7/2005 | Cherkauer et al. |
| 2005/0177749 A1 | 8/2005 | Ovadia |
| 2005/0197859 A1* | 9/2005 | Wilson et al. ............ 705/2 |
| 2005/0203771 A1 | 9/2005 | Achan |
| 2005/0210005 A1 | 9/2005 | Thompson et al. |
| 2005/0228808 A1 | 10/2005 | Mamou et al. |
| 2005/0239601 A1 | 10/2005 | Thomas |
| 2005/0251533 A1 | 11/2005 | Harken et al. |
| 2005/0256834 A1 | 11/2005 | Millington et al. |
| 2005/0273365 A1 | 12/2005 | Baumgartner et al. |
| 2006/0004588 A1 | 1/2006 | Ananda |
| 2006/0005244 A1* | 1/2006 | Garbow et al. ............ 726/24 |
| 2006/0010127 A1 | 1/2006 | Dettinger et al. |
| 2006/0020506 A1 | 1/2006 | Axe et al. |
| 2006/0031094 A1 | 2/2006 | Cohen et al. |
| 2006/0089123 A1 | 4/2006 | Frank |
| 2006/0129540 A1 | 6/2006 | Hillis et al. |
| 2006/0150086 A1 | 7/2006 | Griffin et al. |
| 2006/0155584 A1 | 7/2006 | Aggarwal |
| 2006/0172724 A1 | 8/2006 | Linkert et al. |
| 2006/0178908 A1 | 8/2006 | Rappaport |
| 2006/0179003 A1 | 8/2006 | Steele et al. |
| 2006/0179178 A1* | 8/2006 | King ............ 710/22 |
| 2006/0206877 A1 | 9/2006 | Kohlmeier et al. |
| 2006/0229918 A1 | 10/2006 | Fotsch et al. |
| 2006/0277198 A1 | 12/2006 | Error et al. |
| 2006/0277215 A1 | 12/2006 | Siegel |
| 2007/0015532 A1 | 1/2007 | Deelman |
| 2007/0027961 A1 | 2/2007 | Holzer |
| 2007/0055552 A1 | 3/2007 | St. Clair et al. |
| 2007/0061318 A1 | 3/2007 | Azizi et al. |
| 2007/0073829 A1 | 3/2007 | Volodarsky et al. |
| 2007/0078686 A1 | 4/2007 | Dettinger et al. |
| 2007/0079332 A1 | 4/2007 | McEnroe |
| 2007/0083393 A1* | 4/2007 | Howell ............ 705/3 |
| 2007/0118540 A1 | 5/2007 | Guo |
| 2007/0130044 A1 | 6/2007 | Rowan |
| 2007/0143273 A1 | 6/2007 | Knaus et al. |
| 2007/0143342 A1 | 6/2007 | VanNostrand |
| 2007/0156655 A1 | 7/2007 | Butler et al. |
| 2007/0156842 A1 | 7/2007 | Vermeulen et al. |
| 2007/0157225 A1 | 7/2007 | Harada et al. |
| 2007/0214015 A1 | 9/2007 | Christian |
| 2007/0220009 A1* | 9/2007 | Morris et al. ............ 707/10 |
| 2007/0237179 A1* | 10/2007 | Sethi ............ 370/469 |
| 2007/0239890 A1* | 10/2007 | Chen et al. ............ 709/238 |
| 2007/0277228 A1 | 11/2007 | Curtis et al. |
| 2008/0033736 A1 | 2/2008 | Bulman |
| 2008/0101374 A1* | 5/2008 | West ............ 370/395.7 |
| 2008/0103794 A1 | 5/2008 | Pettiross et al. |
| 2008/0103818 A1 | 5/2008 | Nolan et al. |
| 2008/0103830 A1 | 5/2008 | Apacible et al. |
| 2008/0104012 A1 | 5/2008 | Nolan et al. |
| 2008/0104104 A1 | 5/2008 | Nolan et al. |
| 2008/0104615 A1 | 5/2008 | Nolan et al. |
| 2008/0104617 A1 | 5/2008 | Apacible et al. |
| 2008/0109158 A1 | 5/2008 | Huhtala et al. |
| 2008/0147790 A1 | 6/2008 | Malaney et al. |
| 2008/0172237 A1 | 7/2008 | Lai et al. |
| 2008/0306872 A1 | 12/2008 | Felsher |
| 2009/0013063 A1 | 1/2009 | Soman |
| 2009/0063665 A1 | 3/2009 | Bagepalli et al. |
| 2009/0064287 A1 | 3/2009 | Bagepalli et al. |
| 2009/0287837 A1 | 11/2009 | Felsher |
| 2010/0004097 A1 | 1/2010 | D'Eredita |
| 2010/0160014 A1 | 6/2010 | Galasso et al. |

FOREIGN PATENT DOCUMENTS

| | | |
|---|---|---|
| JP | 2005-165442 A | 6/2005 |
| KR | 10-2004-00989 62 | 11/2004 |
| KR | 10-2006-00245 60 | 3/2006 |
| WO | WO2004015542 * | 2/2004 |
| WO | WO 2006/026673 A2 | 3/2006 |
| WO | WO 2008/057973 A2 | 5/2008 |

OTHER PUBLICATIONS

Mudigonda, "Overcoming the Memory Wall in Packet Processing: Hammers or Ladders",2005, p. 1-10, ANC S Symposium.*

Benefitting Healthcare Delivery with Secure Data Management, May 2007, White Paper Sun Microsystems, Inc., downloaded from http://www.sun.com/storagetek/docs/503238_5800_Healthcare_LF.pdf, 10 pages.

Integrated Healthcare Information System, Apr. 2004, Ericsson, downloaded from http://www.ericsson.com/hr/products/e-health/Technical_Description_IHCIS_R2A.pdf, 22 pages.

Gallagher et al., "An audit server for monitoring usage of clinical information systems," downloaded Aug. 1, 2007 from http://www.amia.org/pubs/symposia/D004856.pdf, 2 pages.

Masys et al., "Patient-centered access to secure systems online (PCASSO): A secure approach to clinical data access via the World Wide Web," downloaded Aug. 1, 2007 from http://medicine.ucsd.edu/pcasso/pubs/amia-oct97.pdf, 4 pages.

Steiner et al., "Medical data abstractionism: Fitting an Emr to radically evolving medical information systems," 2004, Medinfo, Downloaded Aug. 1, 2007 from http://cmbi.bjmu.edu.crilnews/report/2004/medinfo2004/pdffiles/papers/4130Steiner.pdf, 5 pages.

Gong et al., "An intelligent middleware for dynamic integration of heterogeneous health care applications," Jan. 12-14, 2005, 11th International Multimedia Modeling Conference (MMM"05), Melbourne, Australia, 8 pages.
Maldonado et al., "A mediator-based approach for the integration fo distributed electronic electronic healthcare records," 2004, Medicon, downloaded Aug. 1, 2007 from http://pangea.upv.es/weblogs/pedcremo/wp-content/articles/Medicon2004.pdf, 4 pages.
Seals, the use of XML in Healthcare Information Management, Summer 2000, Journal of Healthcare Information Management, 14(2): 85-95.
International Search Report dated Apr. 21, 2008 in International Application No. PCT/US07/07335.
Chinese Official Action dated Dec. 27, 2010 in Chinese Application No. 200780040929.5.
Chinese Official Action dated Feb. 14, 2012 in Chinese Application No. 200780040929.5.
U.S. Official Action dated Sep. 10, 2010 in U.S. Appl. No. 11/745,902.
U.S. Official Action dated Jan. 10, 2011 in U.S. Appl. No. 11/745,902.
U.S. Official Action dated Aug. 5, 2010 in U.S. Appl. No. 11/745,904.
U.S. Official Action dated Jan. 24, 2011 in U.S. Appl. No. 11/745,904.
U.S. Official Action dated Aug. 8, 2011 in U.S. Appl. No. 11/745,904.
U.S. Notice of Allowance dated Feb. 17, 2012 in U.S. Appl. No. 11/745,904.
U.S. Official Action dated Aug. 5, 2010 in U.S. Appl. No. 11/745,898.
U.S. Official Action dated Dec. 23, 2010 in U.S. Appl. No. 11/745,898.
U.S. Official Action dated Mar. 17, 2011 in U.S. Appl. No. 11/745,898.
U.S. Official Action dated Aug. 18, 2011 in U.S. Appl. No. 11/745,898.
U.S. Official Action dated Dec. 8, 2011 in U.S. Appl. No. 11/745,898.
U.S. Official Action dated Mar. 30, 2012 in U.S. Appl. No. 11/745,898.
U.S. Official Action dated Sep. 18, 2009 in U.S. Appl. No. 11/759,359.
U.S. Official Action dated Apr. 14, 2010 in U.S. Appl. No. 11/759,359.
U.S. Official Action dated Aug. 4, 2010 in U.S. Appl. No. 11/759,359.
U.S. Official Action dated Jan. 20, 2011 in U.S. Appl. No. 11/759,359.
U.S. Official Action dated Nov. 10, 2011 in U.S. Appl. No. 11/759,359.
U.S. Official Action dated Jan. 6, 2011 in U.S. Appl. No. 11/759,361.
U.S. Official Action dated Jul. 8, 2011 in U.S. Appl. No. 11/759,361.
U.S. Official Action dated Apr. 1, 2010 in U.S. Appl. No. 11/760,218.
U.S. Official Action dated Aug. 13, 2010 in U.S. Appl. No. 11/760,218.
U.S. Official Action dated May 26, 2011 in U.S. Appl. No. 11/760,218.
U.S. Official Action dated Nov. 9, 2010 in U.S. Appl. No. 11/860,238.
U.S. Official Action dated Feb. 16, 2011 in U.S. Appl. No. 11/860,238.
U.S. Official Action dated May 14, 2010 in U.S. Appl. No. 11/860,627.
U.S. Official Action dated Nov. 15, 2010 in U.S. Appl. No. 11/860,627.
U.S. Official Action dated Feb. 4, 2011 in U.S. Appl. No. 11/860,627.
U.S. Official Action dated Jul. 21, 2011 in U.S. Appl. No. 11/860,627.
U.S. Official Action dated Mar. 16, 2012 in U.S. Appl. No. 11/860,627.
International Search Report dated Mar. 16, 2009 in International Application No. PCT/US08/077552.
International Search Report dated May 22, 2009 in International Application No. PCT/US08/077563.
International Search Report dated Feb. 25, 2009 in International Application No. PCT/US08/077567.
U.S. Official Action dated Apr. 11, 2012 in U.S. Appl. No. 11/745,902.
U.S. Official Action dated Oct. 29, 2010 in U.S. Appl. No. 11/860,016.
U.S. Official Action dated May 13, 2011 in U.S. Appl. No. 11/860,016.
U.S. Official Action dated Nov. 17, 2009 in U.S. Appl. No. 11/860,371.
U.S. Official Action dated Apr. 23, 2010 in U.S. Appl. No. 11/860,371.
U.S. Official Action dated Nov. 19, 2010 in U.S. Appl. No. 11/860,371.
U.S. Official Action dated Mar. 9, 2011 in U.S. Appl. No. 11/860,371.
U.S. Official Action dated Jul. 15, 2011 in U.S. Appl. No. 11/860,371.
U.S. Official Action dated Nov. 17, 2011 in U.S. Appl. No. 11/860,371.
U.S. Official Action dated Jun. 14, 2010 in U.S. Appl. No. 11/860,381.
U.S. Official Action dated Mar. 4, 2011 in U.S. Appl. No. 11/860,381.
U.S. Official Action dated Oct. 21, 2011 in U.S. Appl. No. 11/860,381.
"Design and Implementation Guidelines for Web Clients," 2003, Microsoft, retrieved Aug. 1, 2007 from http://www.willydev.net/descargas/PartnerAndPractices/WillyDev_DIGWC.pdf, 288 pages.
C. H. Crawford, et al. Toward an on Demand Service-Oriented Architecture. Aug. 2, 2007. https:/lwww.research.ibm.com/journal/sj/441/crawford.html, 24 pages.
Sriram Anand. "Managing aEnterprise Data Complexity Using Web Services: Part 1," Jun. 28, 2005, retrieved from http://webservices.sys-con.com.read/104940_2.htm., 3 pages.
"Creating a Custom Data Paging Solution with IBM WebSphere Portlet Factory," Jun. 21, 2007. http://download.boulder.ibm.com/ibmdl/pub/software/dw/wes/pdf/wpfsamps/CustomDataPaging.pdf. 5 pages.
U.S. Official Action dated Jul. 19, 2012 in U.S. Appl. No. 11/759,359.
U.S. Official Action dated Jul. 19, 2012 in U.S. Appl. No. 11/860,016.
Tohru, Ishiguro, "Challenge to Grid System Using OGSA GT3; Service Oriented System by Grid," Mar. 1, 2004, Java Developer, No. 20, pp. 72-79, Softbank Publishing, Japan.
Japanese Official Action dated Jun. 8, 2012 in Japanese Application No. 2009-535477.

* cited by examiner

HEALTH INTEGRATION PLATFORM PROTOCOL

CROSS-REFERENCE TO RELATED APPLICATION(S)

This application claims the benefit of U.S. Provisional Patent Application Ser. No. 60/863,897 filed on Nov. 1, 2006, entitled "INTERACTIVE AND INTUITIVE HEALTH AND FITNESS TRACKING," the entirety of which is incorporated herein by reference.

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing and management has become increasingly popular.

For example, collaborative social networking websites have exploded world-wide. These sites allow users to create remotely stored profiles including personal data such as age, gender, schools attended, graduating class, places of employment, etc. The sites subsequently allow other users to search the foregoing criteria in an attempt to locate other users—be it to find a companion with similar interests or locate a long lost friend from high school. As another more practical example, banking websites offer users the ability to remotely store information concerning bills to be paid. By utilizing this feature, users can automatically schedule bill payments to be made from their bank account which will be automatically debited when the payment is scheduled. This allows simultaneous electronic management of account balancing and bill paying such to save the user from manually entering checks into the register of their checkbook.

These communications require use of some kind of protocol to provide data conformity such that the website being utilized knows what the user is requesting. Some basic protocols exist today, but are many times too open-ended, meaning the standards of communicating data are so loose that it can be easy to make malicious requests and effectively injure websites. Additionally, some protocols can be too tight, or application specific, such that it is virtually impossible to add functionality to a system without reimplementing the protocol (requiring software updates to many parts of the system).

Another area of great interest in this country and the entire world is personal health and fitness. Many vastly differing concerns can be discussed in this area, such as setting and obtaining personal fitness goals and the vastly disparate topic of the inefficiencies existing in our health system. For example, today an individual wishing to receive pharmaceutical treatment for illness must first see their primary care physician. Before seeing the physician, the patient will, many times, be required to show their health insurance coverage card. During the visit, the physician will typically write a prescription for the patient. The patient, then, takes the prescription to the pharmacy for fulfillment at which time they may need to furnish their health insurance coverage card again. The pharmacy fills the prescription, notifies insurance, deducts any coverage amount and transfers the prescription to the patient upon payment of the balance. These manual steps are time-consuming, annoying, and inefficient.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A protocol for communicating extensible markup language (XML)-based application data is provided where the XML request and/or response data can be packaged in a data envelope with a header that comprises information regarding the packaged data and/or the envelope itself. In this regard, the protocol can be application specific to a degree by allowing application information to be specified in the header, but at the same time, the protocol is extensible due to its extensible nature. Application information to be specified in the header can include general information, such as number of records to be called, etc., or more specific information, such as actual record identifiers and/or actors involved in the transaction. In the context of a health integration network, for example, allowing specification of record and/or actor identifiers allows the health integration network to make preliminary judgments about the request as it is being received. By utilizing the identifiers, a protocol component of the health integration network can leverage the network to ensure the actors involved are authorized to view requested data, for example, as the data envelope is being received by the protocol component. If the actors are not even authorized to access the requested information, the protocol component can cease communication with the requesting application for the request, and in this way, malicious requests can be prevented. As another layer of security, the requesting application can sign its request with a private key to prove its identity. The receiving entity can utilize a stored key that relates to the application to decrypt the request; if decryption is successful, the receiving entity can proceed.

Additionally, the protocol can allow compression methods and encryption keys to be specified in the header. Upon receiving a request for data, the receiving application, a health integration network for example, can store this information. It can be stored as an addendum to the data request or stored, for example, in the protocol component as the request is routed through the network. Once desired information is obtained to fulfill the request, the health integration network can form a data envelope complying with the protocol specification and use the earlier specified compression method to compress the data enabling bandwidth to be conserved on the return communication. Additionally, the health integration network, or other underlying application, can encrypt the data with a specified public encryption key before returning it back to the requesting entity. Upon returning the data envelope with the resulting data, the requesting application can uncompress and/or decrypt the data (with a private decryption key for example) since it specified the compression/encryption to be utilized in the initial request.

To the accomplishment of the foregoing and related ends, certain illustrative aspects are described herein in connection with the following description and the annexed drawings. These aspects are indicative of various ways which can be

DETAILED DESCRIPTION

A protocol is provided to facilitate communicating data between two applications, for example where one application can be a health integration network. The protocol can communicate using extensible markup language (XML) over a hypertext transfer protocol (HTTP) communication channel. Additionally, the HTTP channel can allow secured communication between the applications. The protocol can provide various components that have a single protocol component to send and receive communications according to the protocol specification. The protocol specification can enable a sending application to specify compression methods that it can utilize to decompress a return message, and the receiving component can select and apply at least one of the specified methods to compress a return message before sending back to the initially requesting entity. Moreover, a protocol component for a receiving application can incrementally read an incoming message to determine a workload requirement. This requirement can be determined from properties of the message as the message is being read, and the receiving component can drop the communication at any time to prevent the application from overloading a system on which the application is executing. This can help prevent denial of service (DOS) attacks and the like. Additionally, the protocol can be used in conjunction with a health integration network that stores personal health related data in a plurality of disparate data stores to provide a centralized system for retrieving, storing, modifying, and otherwise accessing health related data. Thus, the protocol specification can provide for information related to data within the health integration network to be stored in a protocol transmission such that some management tasks can be performed as a function of the transmission, rather than requiring certain applications to perform them. Management tasks can include verifying authorization given record and/or actor identifiers, verifying an authorization token, ensuring the requesting application has sufficient permissions to access the data and/or methods requested, etc. This eases development of applications and platforms related to the health integration network.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
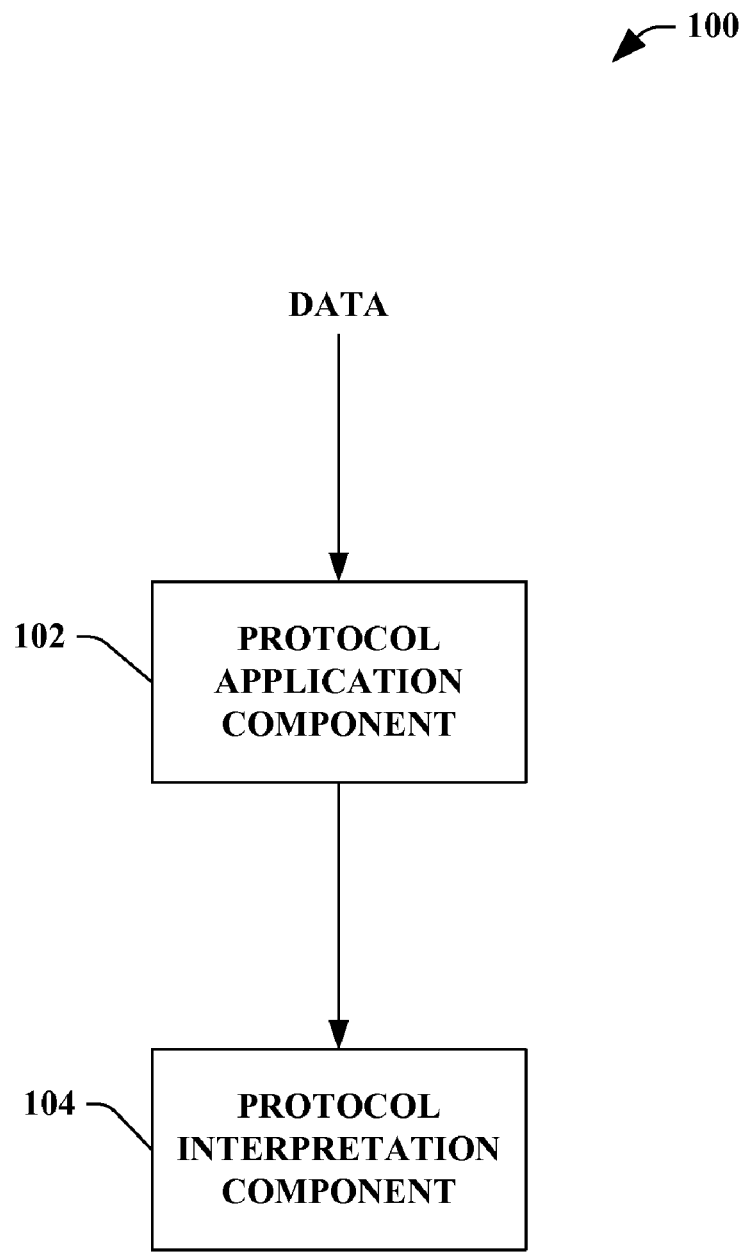
FIG. 1 illustrates a block diagram of an exemplary system that facilitates communicating data using a protocol.

Now turning to the figures, FIG. 1 illustrates a system 100 that facilitates conforming data to a protocol for transmission to a disparate component. A protocol application component 102 is provided to take incoming data and conform the data to a protocol. Additionally, a protocol interpretation component 104 is provided that receives the data according to the protocol and can separate the data into logical portions. For example, data can be sent to the protocol application component 102 where the data is packaged into a data envelope comprising the data and a header. The header can comprise additional data about the data (metadata), data regarding transmission, data about data to be returned from the receiving system, and the like. Additionally, the protocol application component can sign, compress, and/or encrypt at least a portion of the data and prepare the data for submission to the protocol interpretation component.

As the data envelope is being sent to the protocol interpretation component 104 (which may sit in front of or comprised within a remote application), the protocol interpretation component 104 can incrementally read the data and make assumptions based on portions of the read data. For example, since the data supposedly conforms to the protocol applied by the protocol application component 102, the protocol interpretation component 104 can begin to read data as it is being submitted (likely in data packets as is standard in HTTP communications over transmission control protocol and internet protocol (TCP/IP), for example). If the header does not appear to comply with the protocol specification, the protocol interpretation component 104 can close the communications channel. This can protect against at least one level of unauthorized use of the system that sits behind the protocol interpretation component, such as a health integration network, for example.

Additionally, the protocol interpretation component 104 can begin to read the header and extract other information, concerning workload for example (such as an envelope size and/or method call information including the number of method calls requested) to add another layer of protection, against DOS attacks for example. Moreover, the header can comprise information regarding the system to which the data is being sent. For example, in conjunction with a health integration network, data can be sent to the protocol interpretation component 104 according to the protocol specification. Information in the header that corresponds to the protocol specification can include, for example, a record_id identifying a record in the network for which access is being requested, as well as identifiers for the actors involved in the request. The protocol interpretation component 104 can interpret this information as it is being sent and make preliminary authorization requests to ensure the access requested is even authorized before receiving the full data envelope. If not, the protocol interpretation component 104 can terminate the communication and stop processing the data envelope. The protocol interpretation component 104 can set a trust-level based on the preliminary determination and evaluate the trust-level against a threshold to decide whether the envelope should be read and processed in its entirety. Again, this protects against unauthorized use of an underlying system. It is to be appreciated that data can be specified in the protocol interpretation component 104 to protect against such use in temporary and immediate cases as well, such as for example data indicative of a constant malicious user specified by an administrator (or using artificial intelligence) like an address or a common request or number of requests specified.

Figure 2:
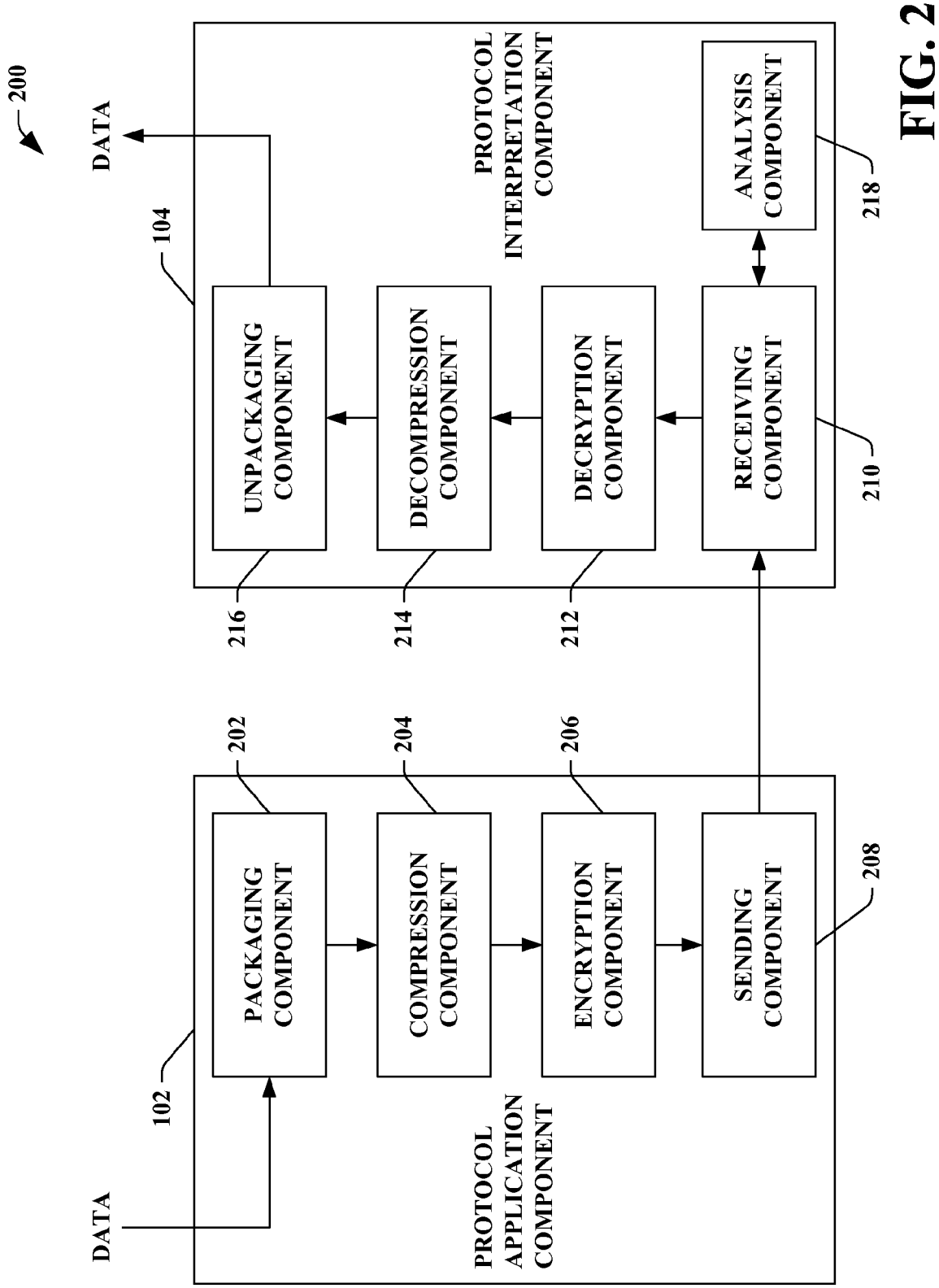
FIG. 2 illustrates a block diagram of exemplary protocol components communicating data.

Referring to FIG. 2, a system 200 for communicating data between remote applications is shown. Specifically, a protocol application component 102 can be provided comprising a packaging component 202 that receives data and prepares a data envelope to associate with the data, a compression component 204 that can compress at least a portion of the data to be submitted, an encryption component 206 that can encrypt at least a portion of the data according to an encryption key, and a sending component 210 that sends the data envelope to a disparate system. The disparate system can have a protocol interpretation component 104 that can comprise a receiving component 210 that receives the data envelope and, if sufficient data has been received, can leverage an analysis component 218 to perform some rudimentary low-level functions on the data as received, a decryption component 212 that can decrypt at least a portion of received data according to a decryption key, a decompression component 214 that can decompress at least a portion of compressed data according to a compression method, and an unpacking component 216 that can separate the data from any extraneous associated information (such as a header) that might no longer be relevant.

According to one embodiment of the subject matter described herein, data can be received by the protocol application component 102 and fed into the packaging component 202. The packaging component 202 can prepare a data envelope (which can be an XML envelope) to send along with the data; the data envelope, for example, can comprise data related to the content of the data received, the transmission of the data, the system to which the data is to be sent, and the like. This related information can be comprised within a header, for example. As described, supra, the data can be related to a request made to access personal health related data in a health integration network. In this case, the header can specify data related to a record_id for which access is requested, as well as actors involved in the request. Once the request is sent, the receiving component 210 can incrementally read the request and utilize the analysis component 218 to analyze this information in the header to make preliminary determinations regarding the data that follows and decide whether or not to continue receiving the request. Additionally, the packaging component provides an indication of available compression methods in the header that are supported by the sending application. The receiving application can subsequently utilize this compression information in sending any resulting data (the compression component 204 can be used to apply specified compression methods). This aids in saving bandwidth across the communications medium. The packaging component can associate additional information as well such as embedded authorization information (such as a token), methods being requested, size of the envelope, compression method used, encryption key, etc.

The packaging component 202 then sends the data (and can send the envelope) to the compression component 204, which can apply at least one compression method to the data to save bandwidth. The compression method can be supplied by an initially requesting component and applied by the receiving application (which can also have a protocol application component 102) upon sending data back to the requesting component. For example, in the health integration network context, a requesting application can specify available methods in a data envelope header according to the protocol specification. The protocol component of the health integration network can receive the request and extract the compression methods. The protocol component can determine which method to use and upon receiving data to send back form the health integration network to the initial requesting application, the compression component 204 of the protocol application component 102 portion of the protocol component can apply the compression method before sending the data back.

The data (and envelope) can also be submitted to an encryption component 206 of the protocol application component 102. Similarly, the encryption key can be sent along with a previous request (specified in the header of the data envelope by the packaging component 202 of the requesting entity, for example) and the encryption component 206 of the receiving application can apply the key before sending the resulting data to the requesting entity. It is to be appreciated that the requesting entity can encrypt the data according to a key to prove the authenticity of the data upon sending the data to the receiving entity. This can prevent tampering with the data and the receiving entity can store a decryption key given by the application, for example, and utilize a decryption component 212 to decrypt the data. The data and envelope can also be submitted to a sending component 208 after any compression and/or encryption is applied (if desired). The sending component 208 can send the protocol conformant data to a disparate system and the data can be received by a receiving component 210 of a protocol interpretation component 104. It is to be appreciated that a given protocol component for a system or application can have both a protocol application component 102 and a protocol interpretation component to facilitate sending and receiving data to/from another system or application.

As described, supra, the receiving component can incrementally receive the data from the sending component. The data can be sent by the sending component 208, for example, as an XML document over an HTTP connection (which can involve an underlying packet based communication medium such TCP/IP). Using this medium allows packets to be sent over an open communications channel, and thus, the receiving component 210 receives the data in packets (or segments). In this way, the data is incrementally read by the receiving component 210 and the receiving component 210 can use the analysis component 218 to make judgments about the data as it is being received. Accordingly, the receiving component 210 can, for example, review the header as it is being sent and send the header to an analysis component 218 to determine information such as workload required to receive and/or process the request. Using this determination, the receiving component 210 and/or analysis component 218 can decide whether the continue receiving the request, and if not, the receiving component 210 can drop the request and close the communications channel. In this way, the receiving component 210 and analysis component 218 can help protect against attacks (such as DOS attacks) and security breaches. If the header indicated a gigantic size of a request or a large amount of methods to be accessed, in a health integration network for example, it could deny the request and cease receipt of the data envelope.

Furthermore, the receiving component 210 can read information stored in the header by the packaging component 202 (as mentioned above) such as application specific information, and utilize the analysis component 218 to make requests to the application about the data and perhaps deny requests based on that information. For example, in a request to a health integration network, the header can comprise a record_id and an identifier of a person requesting access to the record (and perhaps the type of access requested) and the receiving component 210 can send the information to the analysis component 218 which can leverage the underlying application to make a decision about the requested access before receiving the rest of the request. The decision can be based on setting a trust-level of the message based on the analysis of the record_id and people identifiers and comparing the trust-level to a threshold. Additionally, the information can comprise a previously used authorization token that can be validated by the analysis component 218 while the receiving component 210 continues receiving subsequent data, for example. Moreover, information from different protocol layers (such as the TCP/IP) layer can be used by the analysis component 218 to make decisions about the request. For example, if an IP address has been making malicious requests in the past, an administrator (or artificial intelligence) can specify this to the analysis component 218, and the analysis component 218 can automatically take action upon request from the IP address or notify/suggest the receiving component 210 to do such. It is to be appreciated that the analysis component 218 can also provide the receiving component 210 with the gathered information and allow the receiving component 210 to determine whether or not to take action. If the determination is made after the data envelope is completely received, the receiving component 210 can compose an error data envelope comprising at least one error code and send the error data envelope back to the requesting application.

Upon receiving at least a portion of the data, the receiving component 210 can send the data to a decryption component 212 that can decrypt the portion of data using a decryption key. The decryption key can be sent in a previous and/or subsequent request, with the current request, known by the system, specified by the system receiving the request (in a subsequent submission, for example), and the like. Upon decrypting the portion of data, the data can be sent to a decompression component 214 as well where at least a portion of the received data can be decompressed according to a compression method. Similarly to the decryption key, the compression method can be submitted by the receiving application in a previous communication with the sending application, specified in the portion of data received, and/or specified in previous or subsequent submission of data from the sending application. After being decompressed (if necessary), the data can be sent to an unpackaging component 216 that can, for example, remove any data that may be extraneous at this point. For example, once the data has made it through the foregoing components, the header and/or envelope may not be needed anymore and can be separated from the data and discarded by the unpackaging component 216.

Figure 3:
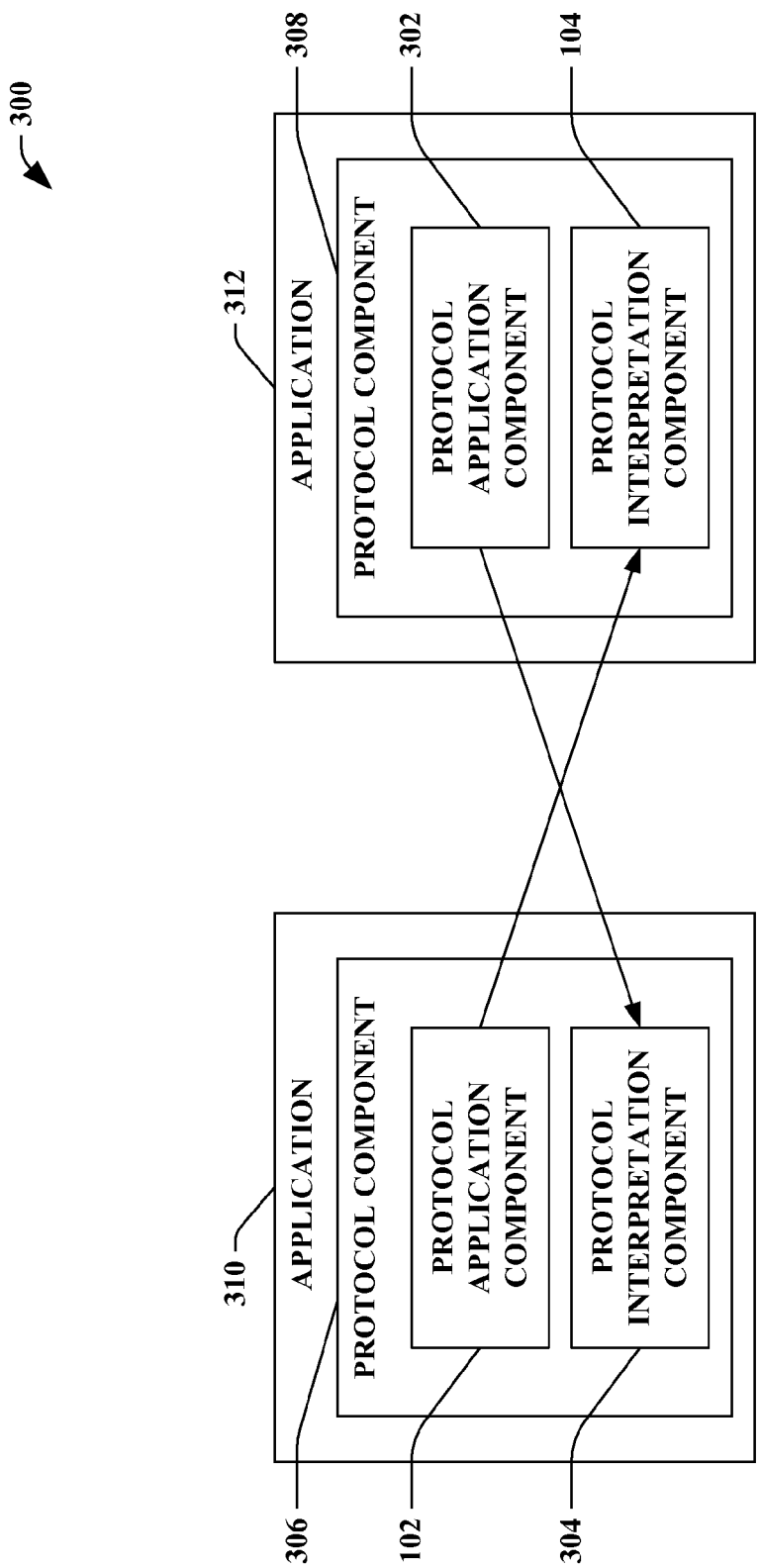
FIG. 3 illustrates a block diagram of an exemplary system that facilitates data communication between two applications using a protocol.

FIG. 3 illustrates a system 300 that facilitates communicating data between disparate applications according to a protocol specification. Two applications are provided 310 and 312 respectively having a protocol component 306 and 308 comprising protocol application components 102 and 302 and protocol interpretation components 104 and 304. In this regard, the protocol components 306 and 308 can communicate with one another since they both have the application and interpretation components. In effect, the protocol application component 102 of application 310 can initiate a request for data, conform the data to the protocol using the components and procedures described supra, and submit the resulting data envelope to the protocol interpretation component 104 of application 312. The protocol interpretation component can interpret the data according to the components and procedures described above and obtain the relevant data.

Application 312 can utilize the data, for example to make a request for data access within a related system. After the application 312 obtains result data to submit back to the requesting application 310, the result data can be packaged up according to the protocol specification by the protocol application component 302 of the application 312. The resulting data can be compressed and/or encrypted according to a compression method and/or encryption key specified in the original request, for example, using the components and procedures above described in reference to the protocol application component. The protocol application component 302 can send the protocol conformant result data back to the application 310 that initiated communication with the application 312. The protocol interpretation component 304 of the application 310 can interpret the result data to obtain the desired information according to the components and procedures described previously. It is to be appreciated that the applications 310 and 312 can be one of a health integration network, personal health devices (e.g. blood pressure monitor, weight scale, blood/sugar level monitor, IV, pacemaker, stethoscope, x-ray, etc.), personal fitness tracking devices (combination heart rate monitor watches, pedometers, bicycle equipment (such as speedometers, altimeters, odometers, etc.), stop watches, and the like), and other applications including user interfaces for personal use and medical use as well as applications that support legacy device communication.

Figure 4:
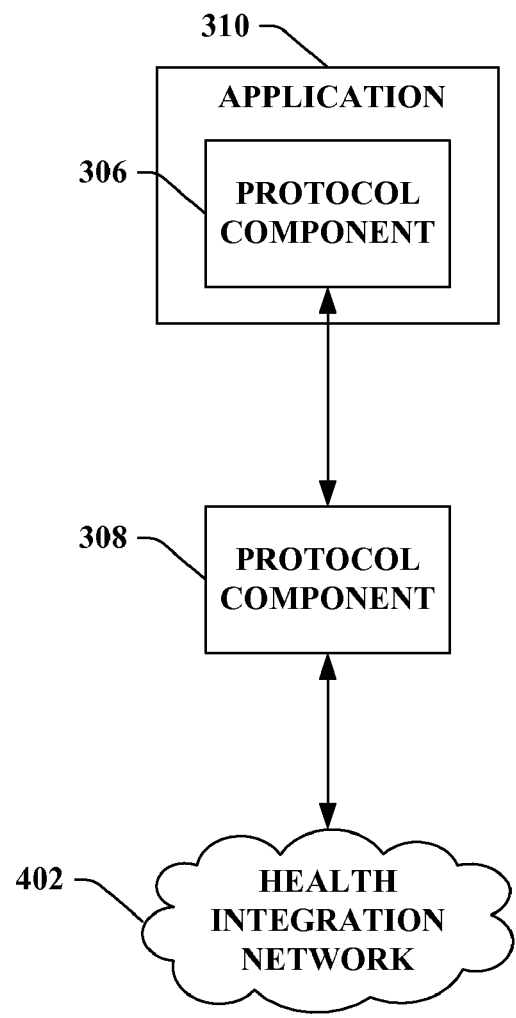
FIG. 4 illustrates a block diagram of an exemplary system that facilitates communicating data with a health integration network using a protocol.

Turning now to FIG. 4, a system 400 is displayed for communicating data to/from a health integration network using a protocol such as the one described herein. An application 310 is provided to request data from a health integration network 402. The application 310 can utilize a protocol component 306 to send requests and receive results and the health integration network 402 can additionally utilize a protocol component 308 to receive the request and return resultant data. As previously described, the protocol components can have respective protocol application components and protocol interpretations components that can utilize the components and procedures described to properly conform the data to the protocol specification by using data envelopes and such. The application 310 can make requests to the health integration network 402, for example, to retrieve, store, modify, add value to, or otherwise access personal health related data stored in the health integration network 402.

As described, the protocol component 308 can specify application 310 specific data within a header of a data envelope for the data. The application specific data can include information regarding methods requested, record identifiers for requested data, user ids, authorization tokens, etc. While incrementally receiving the data envelope, the protocol component 308 can extract some of this information from the header and utilize the health integration network 402 to make preliminary decisions regarding the request for data access. If a decision is made that the request is not desirable, communication can be closed with the application 310 either permanently, temporarily, etc. For example if a record_id and user_id are provided, the protocol component 308 can leverage the health integration network 402 to ensure the user is authorized in the first place to access the data. This provides and additional layer of security over the health integration network 402.

Data requested from the application 310 to the health integration network can be to retrieve, store, modify, or otherwise access, for example, data relating to health such as blood pressure readings, insurance information, prescriptions, family history, personal medical history, diagnoses, allergies, X-rays, blood tests, etc. Additionally, the data can be fitness related, such as exercise routines, exercise goals, diets, virtual expeditions based on exercise routines, competitions, and the like. It is to be appreciated that the protocol components 306 and 308 can be stand alone components and/or can at least partially reside within an application or system. For example, the protocol component 308 can be part of the health integration network 402, as well, the protocol component 306 can be separate from the application 310 and the components are not so limited as depicted in the figures.

Figure 5:
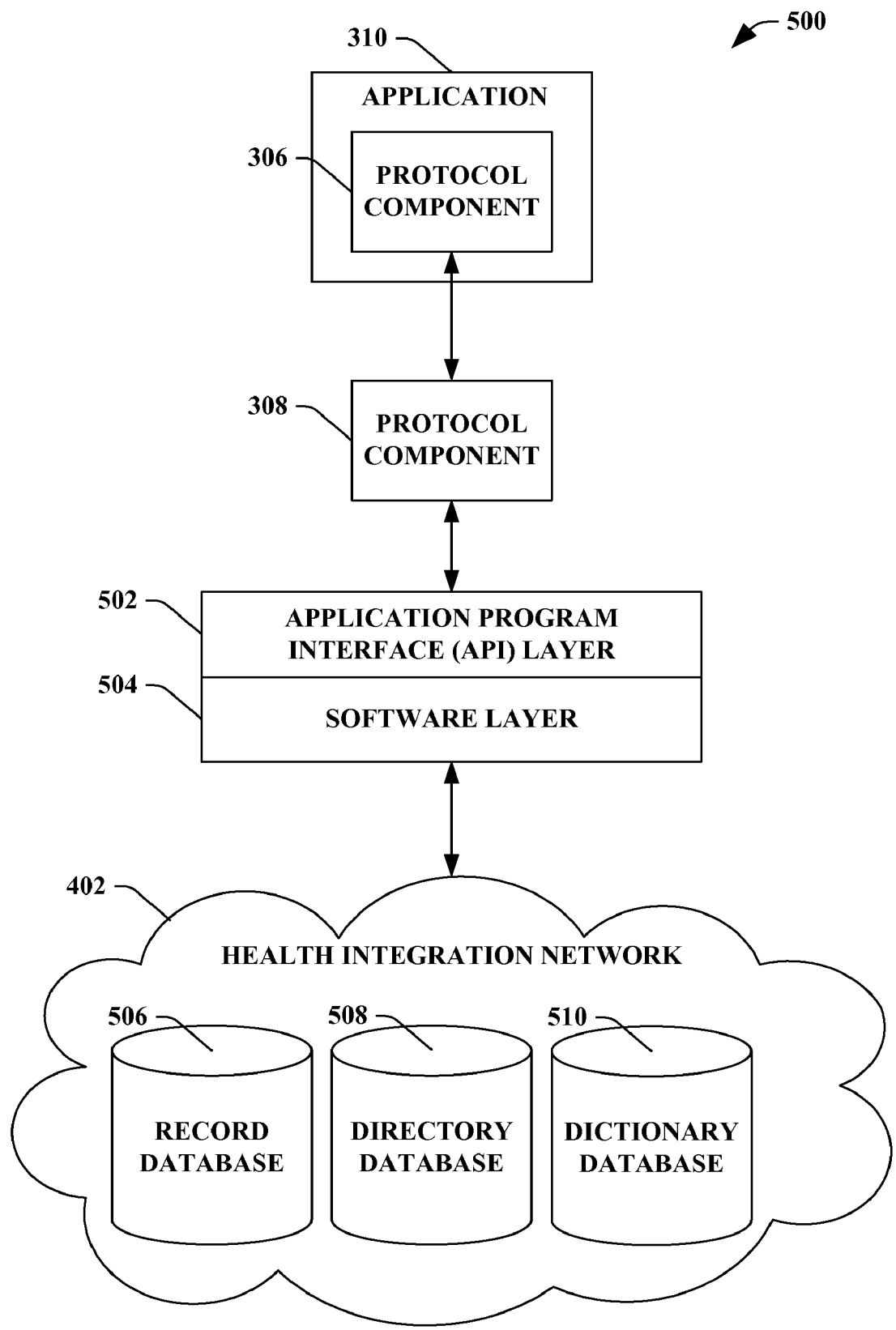
FIG. 5 illustrates a block diagram of an exemplary system that facilitates communicating data with components of a health integration network via a protocol.

Referring to FIG. 5, an example system 500 that facilitates accessing information within a health integration network is shown. An application 310 can at least one of display or specify health related data. It is to be appreciated that the application 310 can be many different types of applications including software applications, electronic devices executing a software application, electronic devices alone, legacy devices interfaceable with a device executing a software application, and the like. The application can comprise a protocol component 306 (or as described, the protocol component 306 can be a separate component accessible by the application 310). The protocol component can conform request data to a protocol for submission to a remote source such as an API 502. The API 502 can also have an associated protocol component 308 to receive requests from and return result data to one or more applications 310. The protocol components 306 and 308 can be those described above, for example, having respective protocol application components and protocol interpretation components and the associated components and procedures used to transmit and receive the data according to a protocol specification.

The API 502 upon receiving the data content request from protocol component 308 can be utilized to request and store data within a health integration network 402. It is to be appreciated that the API 502 can synchronously or asynchronously communicate with a plurality of applications 310, through protocol components 306 and 308, of similar or different types. The API 502 can also have a software layer 502 to leverage in interpreting and processing the request. The software layer 502 can be separated out as shown, or it can be integrated within the API 502, the health integration network 402, or both. Upon interpreting and processing a request from the application 310, the software layer 502 can access the health integration network 402 for any necessary data or to store necessary data to fulfill the request. The software layer 502 can also provide value-add to the data such as assembling data from the health integration network 402, applying business models or processes in conjunction with data, caching data, and/or applying transformations or additional information to/with the data. It is to be appreciated that there may be a plurality of APIs 502 and software layers 502 connecting to a centralized health integration network 402, and the centralized health integration network 402 may be a single system or distributed across multiple systems, platforms, and the like.

The health integration network 402 can comprise a plurality of data stores including a record database 506, a directory database 508, and a dictionary database 510. In addition, the health integration network 402 can comprise many other systems and/or layers to facilitate data management and transfer. Furthermore, the databases can be redundant such that multiple versions of the respective databases are available for other APIs and applications and/or a back-up source for other versions of the databases. Additionally, the databases can be logically partitioned among various physical data stores to allow efficient access for highly accessed systems. Moreover, the databases can be hierarchically based, such as XML and/or relationally based. The record database 506 can be highly distributed and comprise personal health related data records for a plurality of users. The records can be of different formats and can comprise any kind of data (single instance, structured or unstructured), such as plain data, data and associated type information, self-describing data (by way of associated schemas, such as XSL schemas for example), data with associated templates (by way of stylesheets for example), data with units (such as data with conversion instructions, binary data (such as pictures, x-rays, etc.), and the like. Moreover, the record database 506 can keep an audit trail of changes made to the records for tracking and restoration purposes. Additionally, any data type or related instances of the foregoing information can be stored in a disparate database such as the dictionary database 510 described infra. The record database 506 can be partitioned, distributed, and/or segmented based on a number of factors including performance, logical grouping of users (e.g. users of the same company, family, and the like).

The directory database 508 can store information such as user account data, which can include user name, authentication credentials, the existence of records for the user, etc. The directory database 508 can also house information about records themselves including the user to whom they belong, where the record is held (in a distributed record database 506 configuration) authorization rules for the records, etc. For example, a user can specify that a spouse have access to his/her fitness related data, but not medical health related data. In this way, a user can protect his/her data while allowing appropriate parties (such as spouse, doctor, insurance company, personal trainer, etc.) or applications/devices (blood pressure machine, pacemaker, fitness watch, etc.) to have access to relevant data. In addition, the directory database 508 can comprise data regarding configuring applications 310 to interact with the health integration network 402; applications 310 can be required to register with the health integration network 402, and thus, the application data in the directory database 508 includes the registration information.

The dictionary database 510 can hold information relating to vocabulary definitions used by the health integration network 402 and requesting entities such as the API 502 and software layer 502. Such definitions can include data type definitions and information on how to display the different data types or transform them. Additionally, the dictionary database 510 can hold information for display layouts and templates, etc. Furthermore, the dictionary database 510 can hold different look-up tables that define codes through the use of standards and the like. For example, the dictionary database 510 can support International Classification of Diseases, ninth revision (ICD-9) released by the National Center for Health Statistics. These codes identify different diseases and diagnoses; thus a doctor can put one of these codes on a user's chart in the health integration network 402, and the dictionary database 510 can allow the software layer 506 (or API 502) to translate this code into something that makes more sense to the user, such as medical name and/or different, other, or additional information concerning the diagnosis. The dictionary database 510 can also be used to retrieve other metadata such as plural and abbreviated forms of the codes. It can also hold information that allows conversion between different measurement units, such as between feet to meters, Fahrenheit to Celsius.

In one embodiment, the application 310, which can be more than one application, can make a call to the API 502, by utilizing the protocol components 306 and 308 to ensure the data conforms to the protocol specification (such as that described herein), to request, store, or modify data within the health integration network 402, for example. The API 502 leverages the software layer 502 to process the call made by the application 310. The software layer 502 can then query its own internal cache or the health integration network 402 for desired data; additionally or alternatively, the software layer 502 can directly query one or a plurality of the databases 506, 508, and 510 for the desired data. The software layer 502 can serially or asynchronously query for data until the data is obtained from the health integration network 402. The software layer 502 can then manipulate portions of the data using other data it has obtained to formulate the result desired by the application 310 and return that result to the application 310 via the API 502. The API 502 utilizes the protocol component 308 to communicate the data back to protocol component 306 for use with application 310.

For example, an application 310 can request a user's blood pressure reading by formulating a request for data and sending the data to the protocol component 306. The protocol component 306 can associate the request with a data envelope and insert application specific data in the header. The protocol component 306 can then submit the request to protocol component 308 using an XML document over an HTTP connection, for example. The protocol component 308 can interpret the data envelope, extract the request, and forward it to the API 502, which in turn can communicate with the software layer 502 to formulate the desired reading. This, of course, assumes the protocol component 308 did not decide to close communications due to information received incrementally in the data envelope during transfer from protocol component 306. The software layer 502 can query, directly or through the health integration network 402, the directory database 508 to obtain the location of the blood pressure reading, the dictionary database 510 to obtain schema, style, and general type information for blood pressure types, and the record database 506 to obtain the actual reading. Using the schema, the software layer 502 can interpret the record as two integers representing a systolic and diastolic pressure (and perhaps a pulse rate), and return these numbers to the application 310 through the API 502, or also apply a style, units, or other template to the numbers and return the result whether it be a string, XML, a picture, or the like. Additionally, the software layer 502 can return the raw data along with the transformation, style, and/or schema information to the application 310 through the API 502 to allow the application 310 to apply these at will. In either case, the transfer back to the application 310 from API 502 must use the protocol components 306 and 308 in reverse as described above to create a data envelope for sending that conforms to the protocol specification. Also, the software layer 502 can store the result in cache memory for future access. It is to be appreciated that the subject matter described is not so limited to the foregoing example/embodiment, but rather this is one of many possible embodiments of the API 502 that interfaces with a health integration network 402.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

Figure 6:
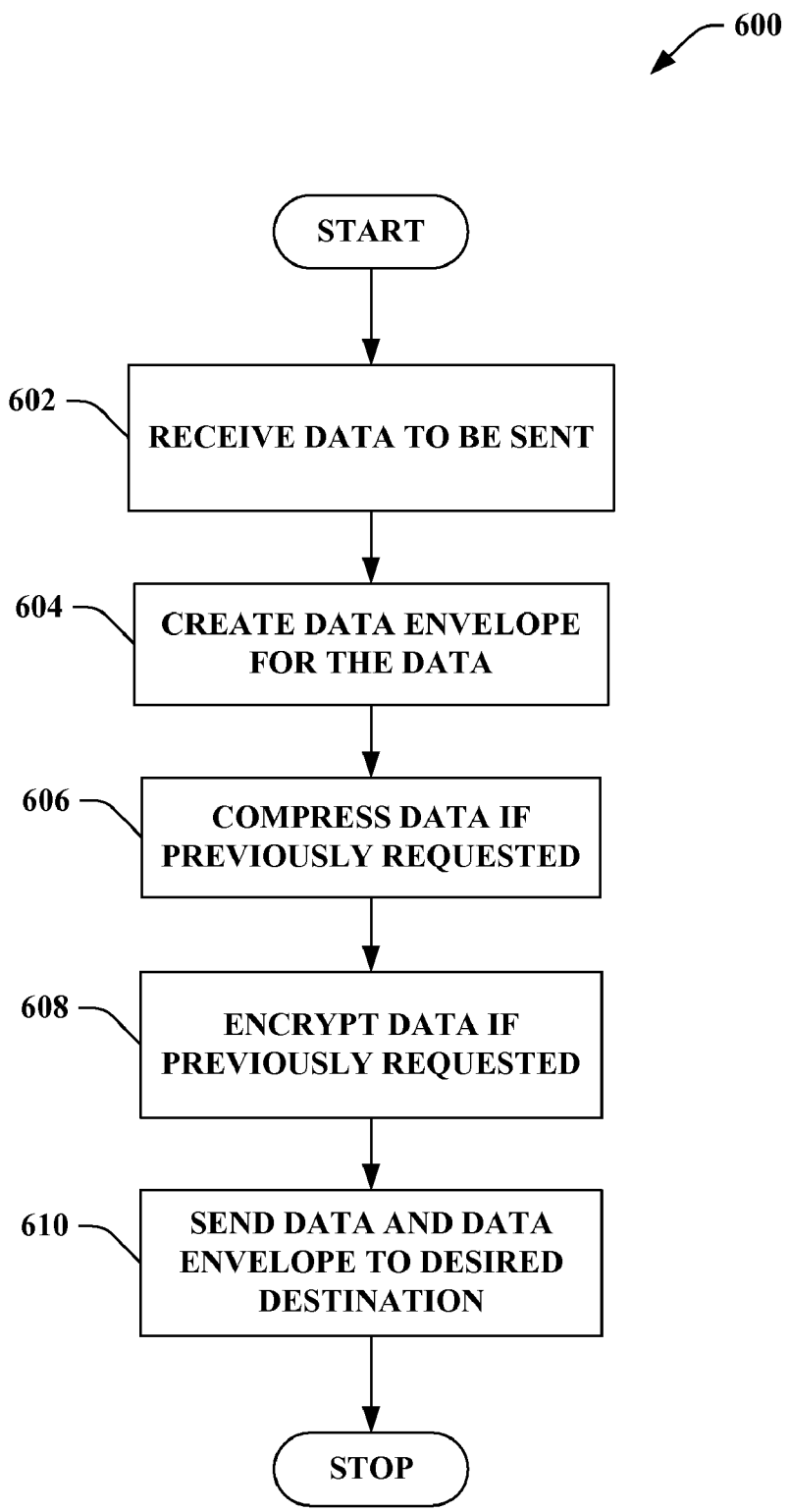
FIG. 6 illustrates an exemplary flow chart for sending data to a desired destination using a protocol.
Figure 7:
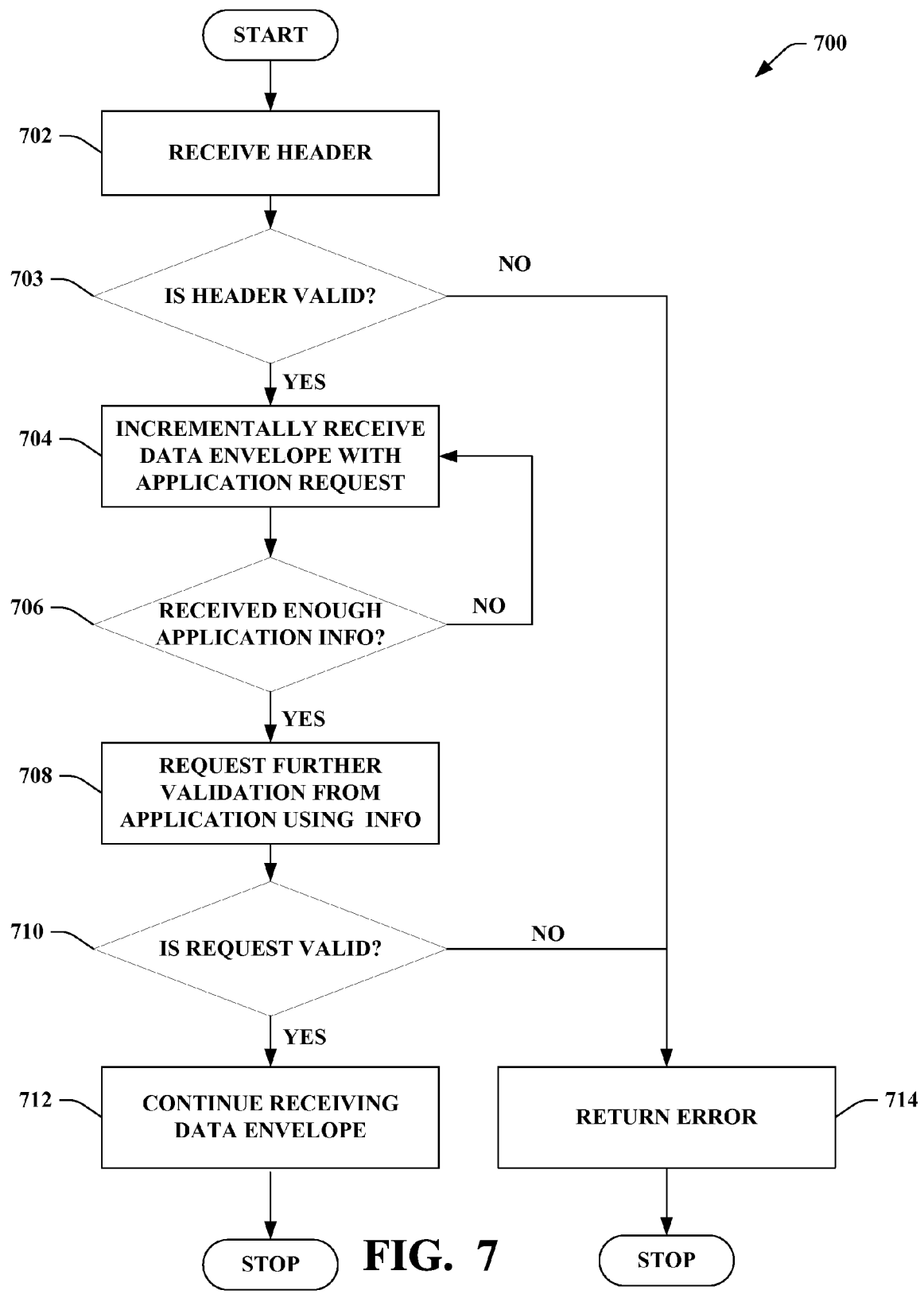
FIG. 7 illustrates an exemplary flow chart for incrementally receiving a data envelope via a protocol.
Figure 8:
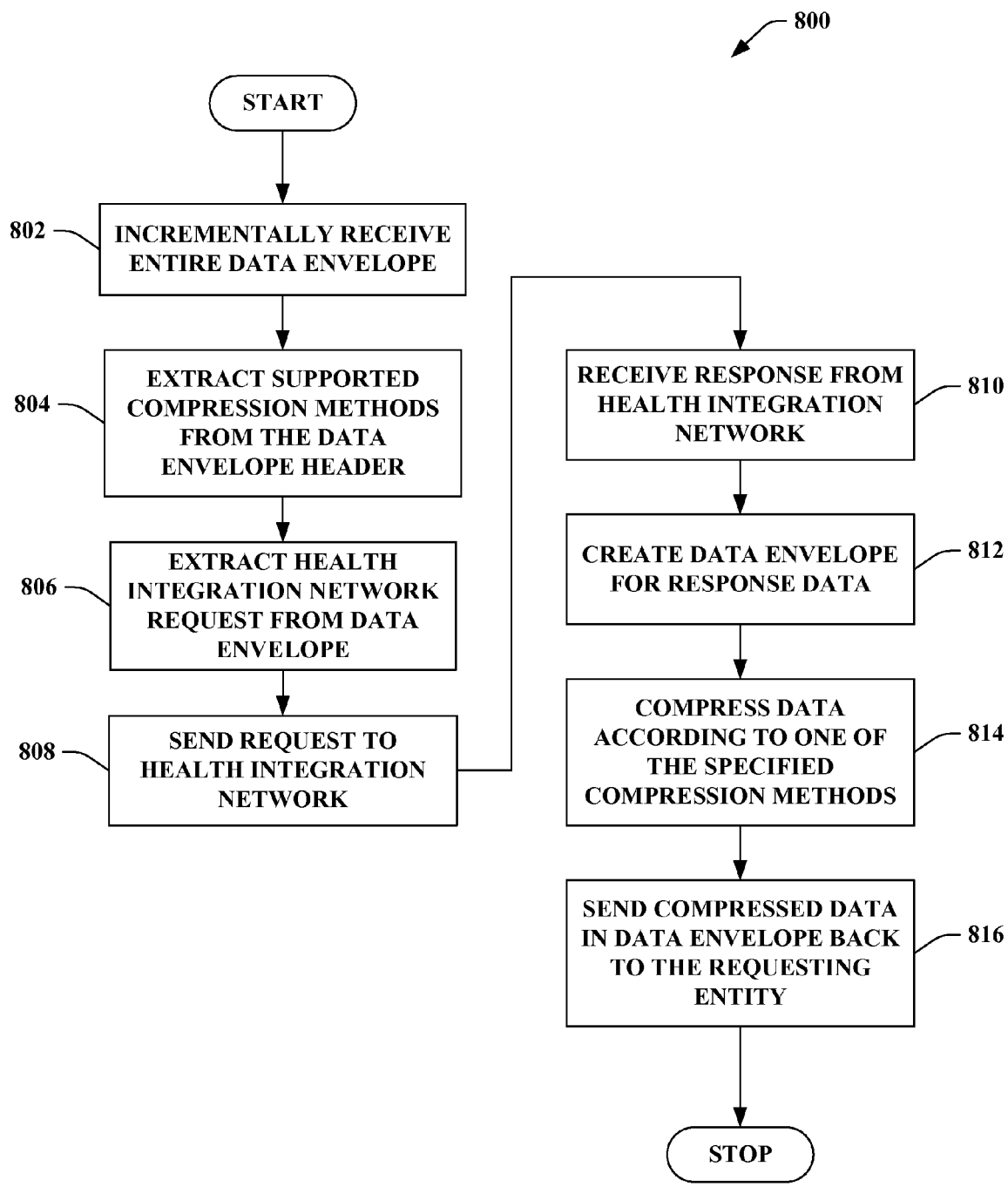
FIG. 8 illustrates an exemplary flow chart for receiving a data request in a health integration network using a protocol.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 6 shows a methodology for conforming data to a protocol specification in accordance with the subject matter herein described. As shown above, the data can be an XML document and the protocol can utilize HTTP to send the message to another application, the other application can utilize the protocol specification to interpret the message. At 602, the data to be sent is received (by a protocol component, for example). The data can take many forms and, for example, can be data related to a health integration network. Such data can include any personal health and/or fitness related data as well as data about such data (metadata, for example). At 604, a data envelope is created for the received data. The envelope can comprise a header that include information about the envelope and/or about the data therein contained so the application to which the data envelope is sent can make early determinations about the data comprised within the envelope. This can help to prevent malicious requests, DOS attacks, etc.

Additionally, information regarding any supported compression methods and/or encryption key(s) can be specified in the header to allow the receiving application to utilize in packaging a return response. For example, compression methods supported by the sending application can be specified, and thus the receiving application can pick a method that it can support and compress a response utilizing that method, such as at reference numeral 606. In this way, bandwidth can be saved in the response which can be helpful in cases where intensive data is requested (such as an image and/or x-ray). In addition, an encryption key can be specified, such as a public encryption key. This allows the receiving application to apply the public encryption key to the response data, such as at reference numeral 608, before submitting to the requesting application. The requesting application, then, knows a disparate private decryption key which is the only key that can decrypt the data. In this regard, sending the public key along with the request poses virtually no security risk since the private key is the only one that can decrypt. Thus, a level of security can be added and taken advantage of with the protocol. It is to be appreciated that the compression and/or decryption are not required steps such as when no methods or keys are specified. At 610, then, the data is sent out in its envelope to the desired destination application. As described, supra, the applications can be one of a health integration network, a personal health device, a software application, a legacy device executing in conjunction with an application, and the like.

FIG. 7 illustrates a methodology 700 that facilitates receiving a data header and making determinations about the data comprised therein before receiving the entire envelope or forwarding the data contents to an application. At 702, a header is received from a requesting application for a request comprising a data envelope that houses the request. The data envelope can comprise, for example, data regarding making a request to the receiving application, where the receiving application can be a health integration network, for example. It is to be appreciated, however, that the receiving application is not so limited and can be any application adapted to receive data complying with the protocol specification described herein. At 703, the validity of the header is checked; to prevent malicious attacks, such as DOS, the header can have requirements it must comply with before the accompanying data envelope can be processed. If the header is not valid, then at 714 an error status is returned to the requesting entity. If the header is valid, then at 704, the data envelope is incrementally received; as described supra, the request can come over an HTTP request using TCP/IP protocol, which facilitates packet-based communicating. Thus, packets can be received and analyzed, at 706, to see if some application info is received. If there is not sufficient info to make application-based determinations about the data envelope, then step 704 repeats to receive additional packet data. It is to be appreciated that the header can be incrementally read in the same regard to determine compliance, and furthermore, that the header can comprise information that can be incrementally validated according to the methods described herein.

If, however, there is enough info, at 708 the info can be utilized to validate the data envelope request. For example, the header of the data envelope can comprise record identifiers as well as identifiers for the actors involved in the request within the data envelope. This information can be utilized to request additional information from the underlying application (such as a health integration network) to receive other information such as if the actors are authorized to even access the data requested. Additionally, an authentication token can be provided in the header and can be analyzed in conjunction with the underlying application once a sufficient portion of the data envelope is received. Once the data is analyzed, a determination can be made, at 710, if the request is valid or not (e.g. can the data in the envelope, which can be a request, even be utilized given the determination just made). If it is likely that the request is valid, then at 712 the data envelope is received until it has arrived in its entirety. At this point, the underlying application can utilize the data in the envelope, perhaps subject to, some additional processing required as described above (decompression, decryption, etc.).

If, however, the request is not valid for any reason (such as described previously, or if, for example, a number of requests can be determined and is too much of a workload), at 714, an error code can be submitted back to the requesting entity and the communication channel can be closed, for example, terminating the data envelope transfer. In this regard, the subject matter herein described protects against unauthorized uses and attacks (such as DOS). It is to be appreciated that the info used in making a validation determination can be a variety of different data values and can also comprise values of the TCP/IP protocol, for example, such as an IP address. Using this information, an administrator (or artificial intelligence) can identify a malicious requestor and the validation determination can be made by comparing IP address to a list of known malicious users, for example.

FIG. 8 shows a methodology for receiving a data envelope in connection with a health integration network. The data envelope can comprise, for example, a request made to the health integration network for health and/or fitness related data, or to store or otherwise modify such data within the network. At 802, the data envelope is received incrementally in its entirety. As described previously, the data envelope can comprise a header and the remainder of the data. The header can comprise data about the content of the envelope as well as data about the envelope in general. At 804, data regarding compression methods supported by the requesting application is extracted from the header. This data can be stored in connection with a protocol component of the underlying application and/or sent with the data on any subsequent forwarding of the data. At 806, the relevant data regarding the health integration network request is extracted from the data envelope and sent to the health integration network at 808. If the compression information is to be sent with the data, then it is additionally sent with the request to the health integration network. It is to be appreciated, however, that the compression method can reside with the protocol interpreter until times comes to utilize the compression method.

At 810, a response to the request is received from the health integration network. It is to be appreciated that this response can comprise compression and/or encryption information that was sent with the original request. A data envelope is created at 812, which can comprise the procedures described in detail above, namely using the compression and/or encryption information sent with the original request to compress and/or encrypt the response data in the data envelope, and at 814 such compression is performed according to one of the specified methods. It is to be appreciated that multiple supported methods can be identified in the original request and upon compressing the data, the optimal supported method on the health integration network end can be chosen. Additionally, the supported compression methods can be ranked in the header, or the header can otherwise indicate a desirability of some methods over others. At 816, the data envelope comprising the compressed data is sent back to the original requesting entity as response to the data envelope received at 802.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
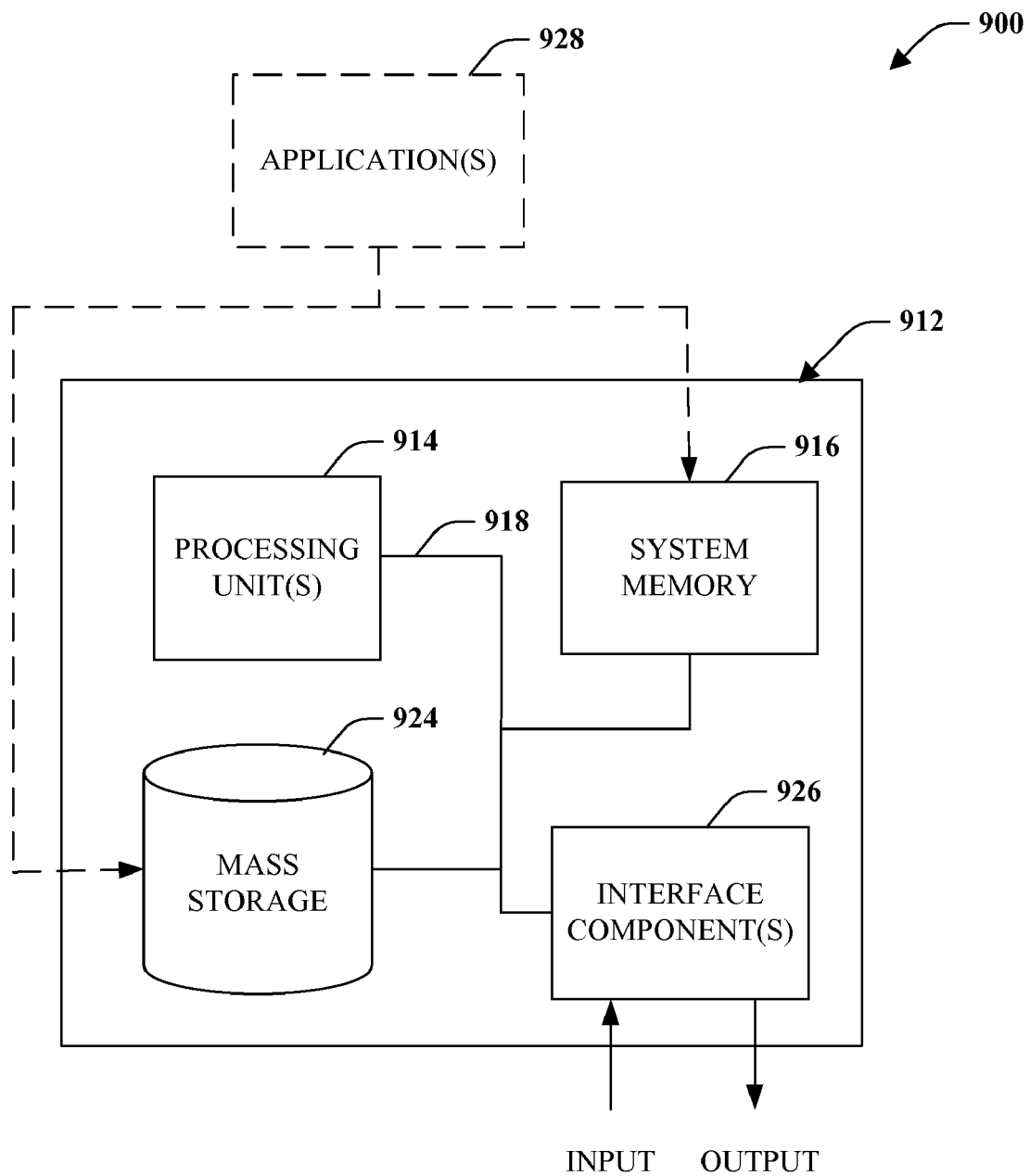
FIG. 9 is a schematic block diagram illustrating a suitable operating environment.
Figure 10:
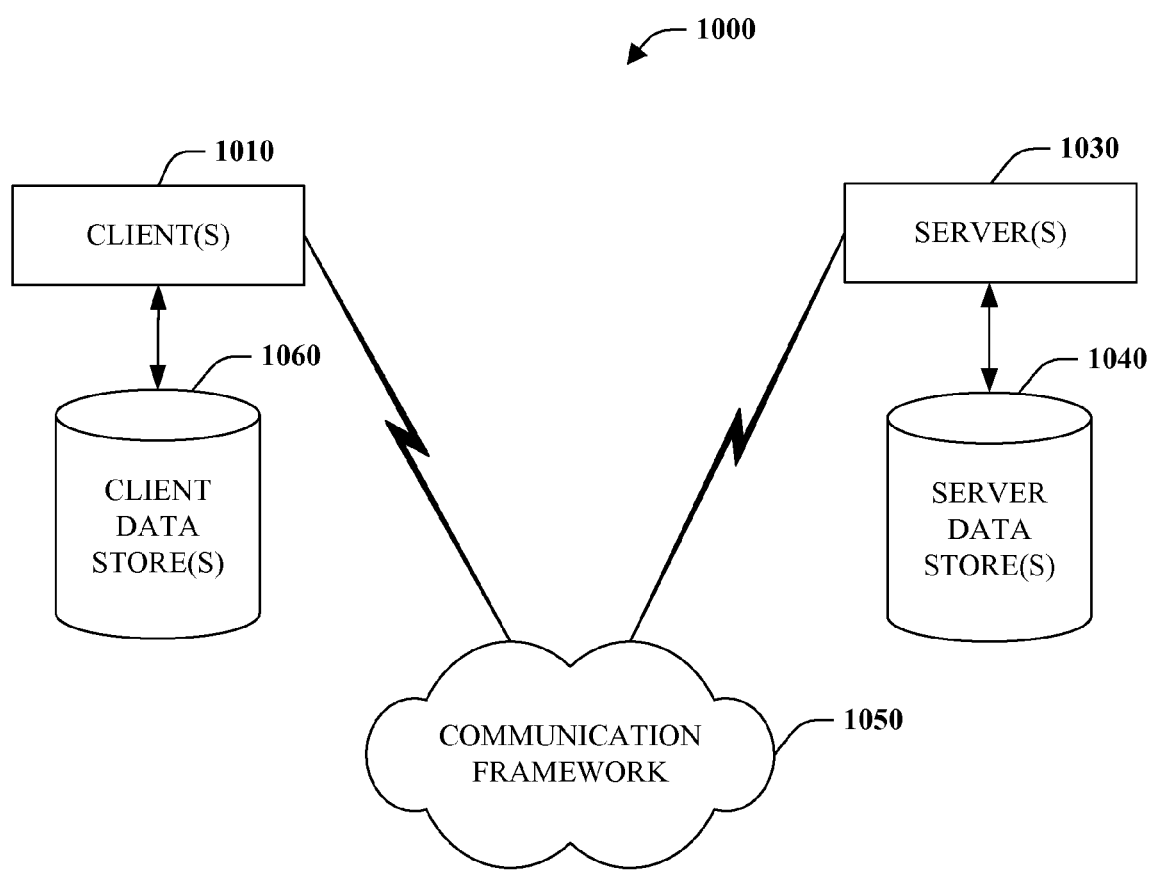
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. Here, the client(s) 1010 can correspond to program application components and the server(s) 1030 can provide the functionality of the interface and optionally the storage system, as previously described. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, a program application component can request personal health information from one or more servers 1030 (and an API stored thereupon or accessible therefrom, for example) via a client 1010. The server(s) 1030 can obtain the desired data from a data store 1040 or a plurality of data stores and apply a transformation, style, and/or schema for example. Subsequently, other program application components can request access to the same or different data from the server(s) 1030. During communications, the clients 1010 and servers 1030 can have protocol components to conform data communications to a protocol specification such as that described herein. Additionally or alternatively, the protocol component(s) can be implemented within the communication framework 1050 to facilitate centralized protocol application mitigating the need for the respective clients 1010 and/or servers 1030 to understand the specifics of the protocol.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A protocol system, comprising:
   a processing unit; and
   a memory storing instructions executable on the processing unit, the instructions comprising
   a receiving component configured to execute on the processing unit and to receive a portion of a first data envelope comprising a request for data access from an application and incrementally read the portion of the first data envelope, and
   an analysis component configured to execute on the processing unit and to receive the portion of the first data envelope from the receiving component, and make a preliminary determination based on the incremental reading of the portion of the first data envelope including whether or not to continue receiving the first data envelope, and
   wherein the preliminary determination is based at least in part on a workload associated with processing the request, indicated in a header of the first data envelope;
   a packaging component configured to receive response data based at least in part on the first data envelope, and package the response data in a second data envelope;
   wherein in the memory further stores an encryption component configured to execute on the processing unit and to encrypt at least a portion of the second data envelope based on an encryption key specified in the first data envelope.

2. The system of claim 1, wherein the memory further stores a a protocol interpretation component configured to execute on the processing unit and to read the header and extract information, including an envelope size and a number of method calls requested, concerning the workload.

3. The system of claim 1, wherein the receiving component is configured to return an error data envelope comprising at least one error code where the first data envelope is entirely received and a trust-level exceeds a threshold.

4. The system of claim 1, wherein the application includes a health integration network comprising a plurality of data stores that respectively store health related data.

5. The system of claim 3, wherein the trust-level is determined by utilizing a health integration network to evaluate an authorization corresponding to a value relating to the request for data access.

6. The system of claim 5, wherein the value relating to the request for data access includes an identifier of a record within the health integration network for which access is requested.

7. The system of claim 6, wherein a user identifier is additionally read from the first data envelope and used in conjunction with the identifier of a record in evaluating the authorization to determine the trust-level.

8. The system of claim 1, wherein the analysis component is configured to make the preliminary determination based at least partly on a past malicious request from an IP address.

9. A method, comprising:
   receiving a data request packaged within a data envelope as an extensible markup language (XML) document, the data envelope comprising at least one header specifying at least information corresponding to a workload associated with processing the request; and
   incrementally reading the data request and making a preliminary determination, based on the workload, concerning whether to continue to read the data request;
   receiving at least one public encryption key in the header;
   decrypting at least a portion of the data envelope using a private decryption key that corresponds to the public encryption key.

10. The method of claim 9, further comprising, if the preliminary determination is made to continue to read the data request, incrementally validating the data request while reading the data request.

11. The method of claim 10, further comprising receiving in the header an indication of a supported compression method.

12. The method of claim 9, further comprising accessing a health integration network comprising a plurality of databases that respectively store health related data to respond to the data request.

13. The method of claim 12, the accessing comprising retrieving health related data stored as an XML document in the health integration network.

14. The method of claim 9, further comprising receiving the data envelope over a hypertext transfer protocol (HTTP) connection.

15. A computer-readable storage medium, wherein the medium is not a signal, storing instructions that, when executed by a computing device, cause the computing device to perform operations comprising:
   receiving an extensible markup language (XML) document representing a data envelope, the data envelope comprising a header and a request for data; and
   incrementally reading the data envelope to make a determination, based on workload information in the header associated with processing the request, concerning whether to deny the request for data and stop processing the data envelope;
   packaging a result in a return data envelope, the result based at least in part on the request for data;
   compressing the result based on a compression method specified in the header; and
   sending the return data envelope to a requesting entity.

* * * * *